United States Patent
Fluga et al.

(10) Patent No.: US 8,024,919 B2
(45) Date of Patent: Sep. 27, 2011

(54) ENGINE SYSTEM, OPERATING METHOD AND CONTROL STRATEGY FOR AFTERTREATMENT THERMAL MANAGEMENT

(75) Inventors: Eric Fluga, Dunlap, IL (US); Donald W. Heston, Chillicothe, IL (US); Richard Kruiswyk, Dunlap, IL (US); Daniel W. Crosby, Chillicothe, IL (US); Brian Hoff, E. Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 1092 days.

(21) Appl. No.: 11/888,034

(22) Filed: Jul. 31, 2007

(65) Prior Publication Data

US 2009/0031715 A1 Feb. 5, 2009

(51) Int. Cl.
*F01N 3/00* (2006.01)
*F01N 5/04* (2006.01)
*F01N 3/02* (2006.01)
*F02B 33/44* (2006.01)

(52) U.S. Cl. ............... 60/280; 60/274; 60/285; 60/295; 60/297; 60/311; 60/611

(58) Field of Classification Search .................. 60/273, 60/280, 285, 295, 297, 311, 274, 597, 611; 95/283
See application file for complete search history.

(56) References Cited

U.S. PATENT DOCUMENTS

| | | | |
|---|---|---|---|
| 5,447,031 A | 9/1995 | Betts et al. | |
| 5,947,681 A | 9/1999 | Rochford | |
| 6,304,815 B1 | 10/2001 | Moraal et al. | |
| 6,474,323 B1 | 11/2002 | Beck et al. | |
| 6,981,370 B2 | 1/2006 | Opris et al. | |
| 7,134,275 B2 | 11/2006 | Tsutsumoto et al. | |
| 7,150,151 B2 | 12/2006 | Mulloy et al. | |
| 2004/0000139 A1* | 1/2004 | Kawashima et al. | 60/295 |
| 2004/0103648 A1 | 6/2004 | Opris | |
| 2006/0236692 A1* | 10/2006 | Kolavennu et al. | 60/602 |
| 2006/0277908 A1* | 12/2006 | Rouphael | 60/605.1 |

FOREIGN PATENT DOCUMENTS

| | | |
|---|---|---|
| EP | 1365125 | 11/2003 |
| EP | 1455060 | 9/2004 |
| JP | 04101010 | 4/1992 |
| WO | WO2006081598 | 8/2006 |
| WO | WO 2007081342 A1 * | 7/2007 |

* cited by examiner

OTHER PUBLICATIONS

Broge, Cummins is ready for the new year, Commercial Vehicle Engineering, Oct. 2006; pp. 1-4, SAE International. http://www.sae.org/automag/features/eblast/10-2006/1-114-10-4.pdf, 1 page, published prior to Oct. 1, 2006.

*Primary Examiner* — Thomas Denion
*Assistant Examiner* — Audrey Klasterka
(74) *Attorney, Agent, or Firm* — Liell & McNeil

(57) ABSTRACT

A method of operating an internal combustion engine system includes passing exhaust gases from an engine to an aftertreatment device such as a particulate filter at an exhaust temperature less than a target temperature, and increasing a temperature of exhaust gases passing through the aftertreatment device to the target temperature by controllably restricting exhaust flow upstream the filter. The method still further includes generating a signal indicative of exhaust back pressure and reducing exhaust pressure by selectively reducing airflow to the engine responsive to the signal. An internal combustion engine system and associated control system includes an electronic control unit configured to selectively increase a temperature of exhaust gases passing through a particulate filter to a regeneration temperature via a variable flow restriction device. The electronic control unit is further configured to reduce exhaust pressure upstream the flow restriction device by commanding adjusting an intake airflow control element for the engine responsive to a signal corresponding to exhaust back pressure.

19 Claims, 2 Drawing Sheets

ENGINE SYSTEM, OPERATING METHOD AND CONTROL STRATEGY FOR AFTERTREATMENT THERMAL MANAGEMENT

TECHNICAL FIELD

The present disclosure relates generally to control systems and strategies for aftertreatment thermal management in an internal combustion engine system, and relates more particularly to limiting exhaust back pressure, during temperature management via controlled restriction of exhaust gas flow.

BACKGROUND

A wide variety of engines, notably compression ignition diesel engines, have a tendency to generate undesired amounts of particulate matter such as soot and ash during operation. It has become almost universal to equip such engines with particulate filters to limit the extent to which soot particles, etc. are discharged during operation. A wide variety of designs for such filters are known, some of which have met with significant commercial success. One feature of all common filter designs on the market is that they tend to clog with trapped particulates over time. It is common for diesel particulate filters to become at least partially clogged with particulates after only a few hours of engine operation. Once particulates accumulate beyond a certain point, engine operation can become compromised.

To continue operating an engine or machine associated with a particulate filter which has become clogged, it is typically necessary to "regenerate" the filter. In other words, something must be done to remove the particulate matter clogging the filter, other than discharging the undesired material into the environment. Certain machines with an internal combustion engine have a duty cycle wherein the engine is operated at a relatively high power output, resulting in exhaust temperatures high enough to "burn off" the clogged particulates. Other machines having lower range duty cycles tend to predominately produce lower temperature exhaust which is rarely, if ever, sufficient to initiate combustion of accumulated particulate matter. Regardless of duty cycle, it is increasingly common to equip engine systems with some auxiliary means for regenerating their particulate filters when needed. One common strategy relies upon the application of auxiliary heat to combust the particulates trapped in the filter, so that the particulate material is consumed while the gaseous combustion products are discharged. Electric heaters, injection of fuel into the exhaust system upstream of the filter, and various other strategies are used for this purpose.

A relatively more recent strategy utilizes heat from the exhaust itself to raise the temperature of the particulate filter and the particulate matter trapped therein to a temperature sufficient to initiate combustion and consequent consumption of the particulate matter. A component known in the art as a variable geometry turbine has been used for this purpose. Variable geometry turbines typically include turbine vanes or movable walls whose position/orientation can be adjusted to restrict flow of exhaust gases through the turbine. As a result, the pressure and thus temperature of the exhaust gases can be increased to initiate combustion and enable burning off of particulate matter in the filter. Systems are also known wherein the air to fuel ratio of the mixture burned by the engine is enriched to increase the temperature of the exhaust gases for regeneration of an associated filter. Relying on either of these strategies has proven to have various drawbacks. On the one hand, adjusting the air to fuel ratio of the engine may be insufficient by itself to raise the temperature of exhaust gases sufficiently to combust particulate matter in the filter. On the other hand, use of the variable geometry turbine strategy alone may also be ineffective, and can cause pressures in and downstream of the engine to increase above that which certain engine systems are designed to accommodate.

U.S. Pat. No. 6,981,370 to Opris et al. is directed to a method and apparatus for regeneration of a particulate matter filter in an exhaust system. Opris et al. disclose an engine system and operating method wherein a throttle valve positioned upstream of the engine is partially closed to reduce the amount of air entering the engine cylinders. Reduction of air is stated to result in a richer fuel/air mixture which in turn increases exhaust gas temperatures. The throttle valve is controlled in cooperation with an "extended open duration" of an intake valve to reach a desired exhaust temperature for filter regeneration. While the strategy set forth by Opris et al. may work quite well, it can be desirable in other instances to regenerate a filter without relying upon use of a variable valve control strategy.

The present disclosure is directed to one or more of the problems or shortcomings set forth above.

SUMMARY OF THE DISCLOSURE

In one aspect, the present disclosure provides a method of operating an internal combustion engine system. The method includes the steps of passing exhaust gases from an internal combustion engine through an aftertreatment device at an exhaust temperature less than a target temperature, and increasing a temperature of exhaust gases passing through the filter to the target temperature at least in part by controllably restricting exhaust flow upstream the filter. The method still further includes the steps of generating a signal indicative of exhaust back pressure during the step of controllably restricting exhaust flow, and reducing exhaust pressure at least in part by selectively reducing airflow to the engine in a manner that is responsive to the signal.

In another aspect, the present disclosure provides an internal combustion engine system that includes an internal combustion engine having an exhaust outlet pathway, and an aftertreatment device positioned within the exhaust outlet pathway. The engine system further includes a flow restriction device for increasing a temperature of exhaust gases from the engine positioned within the exhaust outlet pathway upstream the filter, the flow restriction device having at least two states including an open state associated with a relatively lower exhaust back pressure and a restricted state associated with a relatively higher exhaust back pressure. The engine system still further includes an intake airflow control element positioned upstream the engine and a control device operably coupled with the intake airflow control element to selectively reduce airflow to the engine based at least in part on the exhaust back pressure.

In still another aspect, the present disclosure provides a control system for thermal management of an aftertreatment device of an internal combustion engine. The control system includes an electronic control unit configured to selectively increase the temperature of exhaust gases passing through an aftertreatment device to a target temperature at least in part via commanding adjusting of a variable flow restriction device fluidly between the engine and the aftertreatment device from a relatively more open state to a relatively more restricted state. The control system further includes an indicating device configured to output a signal indicative of exhaust back pressure upstream the flow restriction device, the electronic control unit being further configured to reduce exhaust pressure upstream the variable flow restriction device via commanding adjusting an intake airflow control element for the engine in a manner that is responsive to the signal.

DETAILED DESCRIPTION

Figure 1:
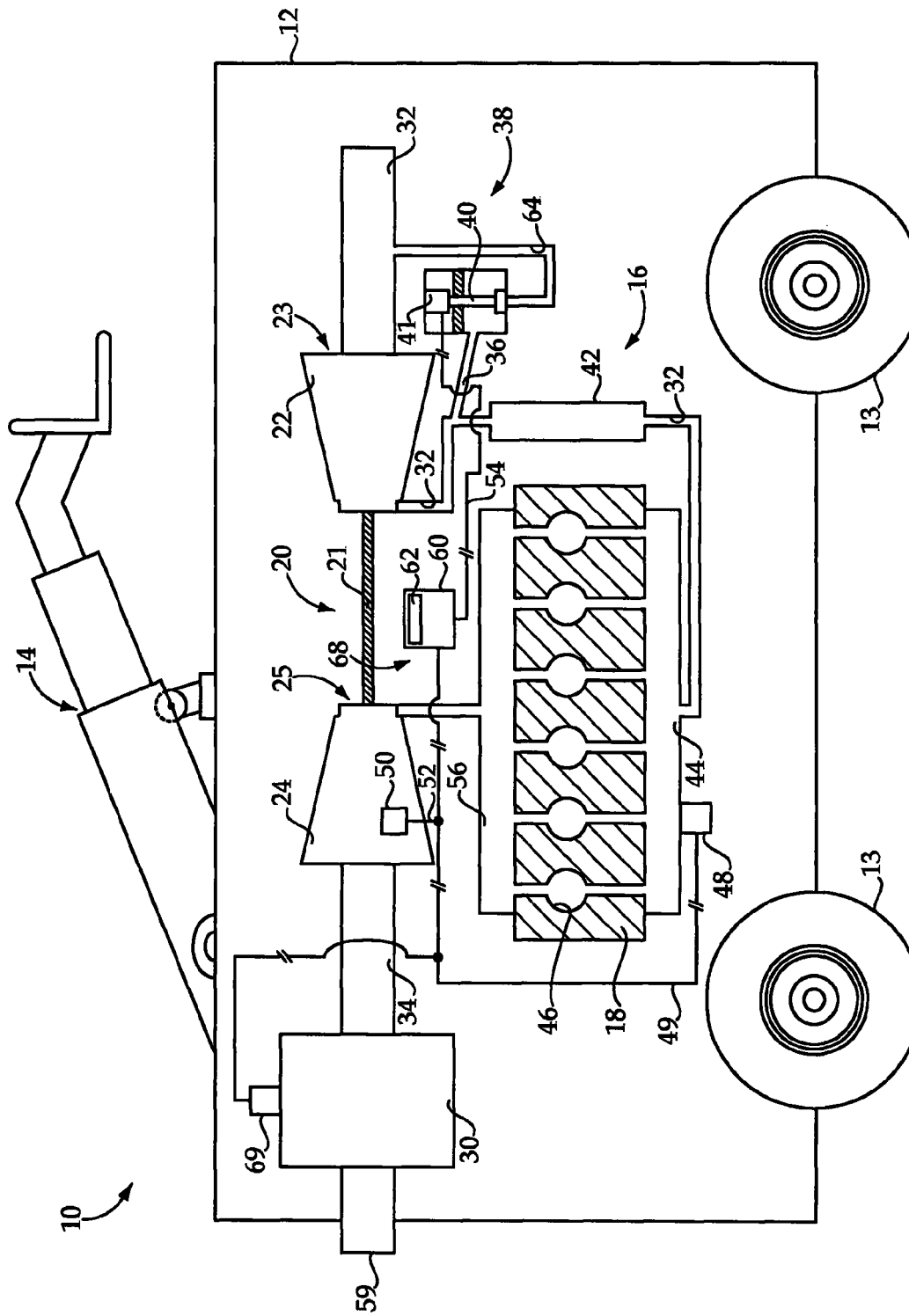
FIG. 1 is a side diagrammatic view of a machine having an internal combustion engine system according to one embodiment.

Referring to FIG. 1, there is shown a machine 10 according to one embodiment of the present disclosure. Machine 10 may include a frame 12 having ground engaging elements 13 and an implement system 14 mounted thereon. In the illustrated embodiment, machine 10 includes an implement system of the type commonly used in machines known in the art as telehandlers. It should be appreciated, however, that machine 10 might have a wide variety of designs. For instance, off-highway machines such as tractors, loaders, etc., as well as on-highway trucks and the like may be constructed and operated according to the teachings set forth herein. In still other embodiments, machine 10 might comprise a stationary machine such as a genset. Machine 10 may include an engine system 16, such as a compression ignition diesel engine system, having an engine housing 18 with a plurality of cylinders 46 therein. An intake air pathway 32 is provided for supplying air to engine system 16, and an exhaust outlet pathway 34 is provided to discharge engine exhaust gases through a particulate filter 30 and out a tailpipe 59. As further described herein, engine system 16 may be configured and operated to regenerate particulate filter 30 in a manner having advantages over known strategies. Other aftertreatment systems, such as urea injection NOx—reducing systems, may also benefit through application of the teachings of the present disclosure. Therefore, while much of the following description emphasizes particulate filter regeneration, it should be appreciated that the present disclosure should not be limited to any specific aftertreatment application and is considered applicable to any engine system where thermal management in an aftertreatment system or process is desired. It is contemplated that the engine system operating strategies described herein will be particularly suited to machines, such as telehandlers, having a relatively low-range duty cycle. In other words, machines such as machine 10 may be operated a relatively large proportion of the time in a lower portion of an available power output range, for example a lower half of an available power output range. The present disclosure is not limited to use in such machines, however, as will be further apparent from the following description.

Machine 10 may further include a turbocharger 20 having a compressor 22 with an inlet 23, and a turbine 24 also having an inlet 25, coupled together via a shaft 21. In one embodiment, turbine 24 may comprise a variable geometry turbine of the type having internal turbine vanes (not shown) which may be controllably adjusted to vary a relative flow restriction of exhaust gases of engine system 16 passing through exhaust outlet pathway 34. Variable geometry turbines having movable walls to adjust an exhaust passage height or width, or a movable plate or the like, are known which might also be used in the context of the present disclosure. In other embodiments, rather than a variable geometry turbine, some other flow restriction device such as a variable gate or the like positioned within exhaust outlet pathway 34 might be used.

Turbine 24 might also be equipped with a wastegate in certain embodiments to allow exhaust gases to bypass turbine 24. An actuator 50 may be operably coupled with turbine 25 to enable adjusting of turbine 24 from a relatively more open state to a relatively more closed state, or vice versa, to vary the extent to which exhaust gas flow is restricted thereby. Those skilled in the art will appreciate that restricting exhaust flow via turbine 24 will pressurize exhaust gases and hence increase their temperature. Actuator 50 may be coupled via a communication line 52 with an electronic control unit 60. In one embodiment, electronic control unit 60 may comprise an engine controller for engine system 16, but might be a controller separate from the engine controller in other embodiments.

Engine system 16 may further include an intake airflow control element 38. Intake airflow control element 38 may include a valve member 40 which is movable between a first position and a second position, selectively connecting a first fluid passage 36 and a second fluid passage 64. Intake airflow control element 38 may also be movable to a plurality of positions between its first and second positions to provide a range of fluid communication states between passages 36 and 64. Together, passages 36 and 64 provide a fluid connection from a position downstream of compressor 22 to a position upstream of compressor 22, the significance of which will be apparent from the following description.

Electronic control unit 60 may be in control communication with actuator 41 via a communication line 54 to enable adjusting of valve member 40 between its different states to control fluid communication between passages 36 and 64. In other embodiments, rather than an electronic control strategy, a passive control strategy utilizing pressure diaphragms or the like might be used to control positioning of valve member 40. In the embodiment shown, intake airflow control element 38 is positioned between compressor 22 and an air-to-air aftercooler 42, also positioned in intake air pathway 32 to cool air compressed via compressor 22. Downstream of aftercooler 42 is an intake manifold 44 configured to supply air to cylinders 46 in a conventional manner. As alluded to above, electronic control unit 60 may be configured to control the state of variable geometry turbine 24, as well as intake airflow control element 38, and potentially other components of machine 10.

Electronic control unit 60 may include a computer readable memory 62 storing program information/software for executing its various control functions. Electronic control unit 60 may further receive inputs from an indicating device such as a sensor 48 via a communication line 49, the inputs being indicative of an intake manifold pressure. Electronic control unit 60 may further receive inputs from another sensor 69 via a communication line 66 which are indicative of a pressure drop across filter 30. Signals received from sensor 69 may be used by electronic control unit 60 to determine that a pressure drop due to accumulated particulate matter in filter 30 is sufficient to justify initiating regeneration thereof.

It is contemplated that sensing a pressure drop across filter 30 will be one practical implementation strategy for determining when initiation of filter regeneration is appropriate. Alternatives are contemplated, however, such as regenerating filter 30 at predetermined times or after predetermined periods of operation regardless of pressure drop. Further still, other aspects of operation of engine system 16 might be monitored to indirectly infer when regeneration of filter 30 is appropriate, such as monitoring how frequently and/or for how long engine system 16 is operated at idle speed or low load, etc., or how frequently and/or for how long engine system 16 is operated at a predetermined high speed and/or load. It will thus be appreciated that the present disclosure is not limited to any particular strategy for determining a timing of initiation of filter regeneration. Regardless, once it is determined that filter regeneration is appropriate, electronic control unit 60 may carry out filter regeneration in accordance with a unique strategy whereby exhaust gas temperature is increased from a temperature less than a filter regeneration temperature to a temperature equal to or greater than a filter regeneration temperature to initiate combustion of particulate matter trapped in filter 30. As mentioned above, in other embodiments exhaust temperature may be increased for purposes other than filter regeneration, such as facilitating operation of a different type of aftertreatment device. In one embodiment, exhaust gas temperatures may be increased by controllably restricting exhaust flow upstream of filter 30 with variable geometry turbine 24. In particular, electronic control unit 60 may output signals to actuator 50 to adjust vanes, walls, or another adjustable flow restriction structure within turbine 24 to restrict exhaust flow. Those skilled in the art will readily appreciate that restricting exhaust flow with turbine 24 will create exhaust gas back pressure upstream of turbine 24. The present disclosure further provides a means for selectively reducing exhaust gas pressure upstream of turbine 24 to avoid damage to hardware of engine system 16, or otherwise affect operation of engine system 16.

During controllably restricting exhaust flow with turbine 24, electronic control unit 60 may receive signals generated via sensor 48 indicating intake manifold pressure. These signals/inputs may be used to control intake airflow control element 38 to limit exhaust back pressure. An exhaust manifold pressure sensor might also be used, in a similar manner. In general, intake manifold pressure will increase as exhaust back pressure upstream of turbine 24 increases. There is at least a generally proportional relationship between intake manifold pressure and exhaust back pressure upstream turbine 24. Electronic control unit 60, by monitoring intake manifold pressure, can determine when exhaust back pressure is at or exceeding a threshold, then output control commands to element 38 to selectively adjust airflow to engine system 16 and thereby reduce exhaust pressure upstream of turbine 24, as further described herein. Electronic control unit 60 may thus be understood as selectively reducing airflow to engine system 16 in a manner that is responsive to signals generated via sensor 48, which are indicative of exhaust back pressure.

Indicating device 48 might also comprise a device which outputs signals based on parameters indirectly indicative of intake manifold pressure and therefore indirectly indicative of exhaust back pressure upstream turbine 24. For instance, turbocharger speed, engine speed, load, fueling, etc. might be mapped to intake manifold pressure and, hence might be mapped to exhaust back pressure. It should therefore be appreciated that generating a signal indicative of exhaust back pressure, used by unit 60 to reduce exhaust pressure upstream of turbine 24, might take place in a variety of ways other than simply outputting a signal from a pressure sensor. Accordingly, unit 60, or a processor thereof, could fairly be considered to be an indicating device in some embodiments as it could generate a signal indicative of exhaust back pressure based on map values, values calculated via an equation, etc.

Position data for element 38 might also be recorded and mapped to recorded exhaust back pressure data, for instance pressure data developed in a laboratory or during a calibration of engine system 16. In other words, in setting up engine system 16 for operation, intake airflow control element 38 might be varied during operating engine system 16, and exhaust back pressure data recorded to establish a map having terms for exhaust back pressure and a position of intake airflow control element 38, or a position of actuator 41. This strategy would enable controlling exhaust back pressure via control signals to element 38 which are generated without directly sensing pressure anywhere in engine system 16.

Electronic control unit 60 will thus typically, but not necessarily, reduce exhaust pressure upstream of turbine 24 in a manner that is responsive to signals from sensor 48. As mentioned above, the reduction in exhaust pressure may be achieved by selectively reducing airflow to engine system 16 via intake airflow control element 38. In particular, when electronic control unit 60 determines that exhaust gas back pressure is too high, it may output control signals to intake airflow control element 38 to adjust valve member 40 via actuator 41 to a position at which fluid communications are established between passage 36 and passage 64. As a result, air pressurized via compressor 22 is diverted from intake air pathway 32, effectively reducing airflow provided to cylinders 46. It should be understood that "intake air pathway 32" generally refers to the primary air intake passages upstream of compressor 32, and also downstream of compressor 32, to cylinders 46. Fuel injection into cylinders 46 will typically continue as directed by electronic control unit 60, or another engine controller, to provide fuel to engine system 16 based on speed and/or load, etc. Diverting air from intake air pathway 32 with intake airflow control element 38 will generally have two effects on engine system 16.

On the one hand, reducing intake airflow will reduce the air pressure supplied to intake manifold 44 and hence to cylinders 46. This reduction in air pressure can alleviate exhaust gas back pressure caused by the restricting of exhaust flow with turbine 24. Diverting air from intake air pathway 32 can also have the effect of creating a relatively higher fuel to air ratio provided to engine system 16, resulting in a corresponding increase in temperature of exhaust gases supplied to turbine 24, and thenceforth to filter 30. In other words, for a given fuel energy, a relatively smaller mass of air will reach a relatively higher temperature than would occur with a larger mass of air.

Accordingly, by controlling engine system 16 in the manner described, exhaust back pressure created by restricting exhaust flow with turbine 24 can be alleviated, while the temperature of the exhaust gases supplied for initiating combustion of particulate matter in filter 30 can actually be maintained or increased. In other words, problematic exhaust gas pressure can be reduced without what might otherwise be an expected tradeoff of reduced exhaust gas temperature.

Intake airflow control element 38 is shown as a variable gate positioned such that air is diverted out of intake air pathway 32, then returned to intake air pathway 32 upstream of compressor 22, in an already compressed condition. While this is contemplated to be one practical implementation strategy, the present disclosure is not thereby limited. In other embodiments, intake air might be diverted at a different location, anywhere downstream of compressor 22, and might also be returned at a different location within engine system 16 than that shown, possibly downstream of turbine 24 or even downstream of filter 30. Further still, intake air might simply be diverted and discharged to atmosphere or to another subsystem of machine 10 where compressed air is needed.

INDUSTRIAL APPLICABILITY

Figure 2:
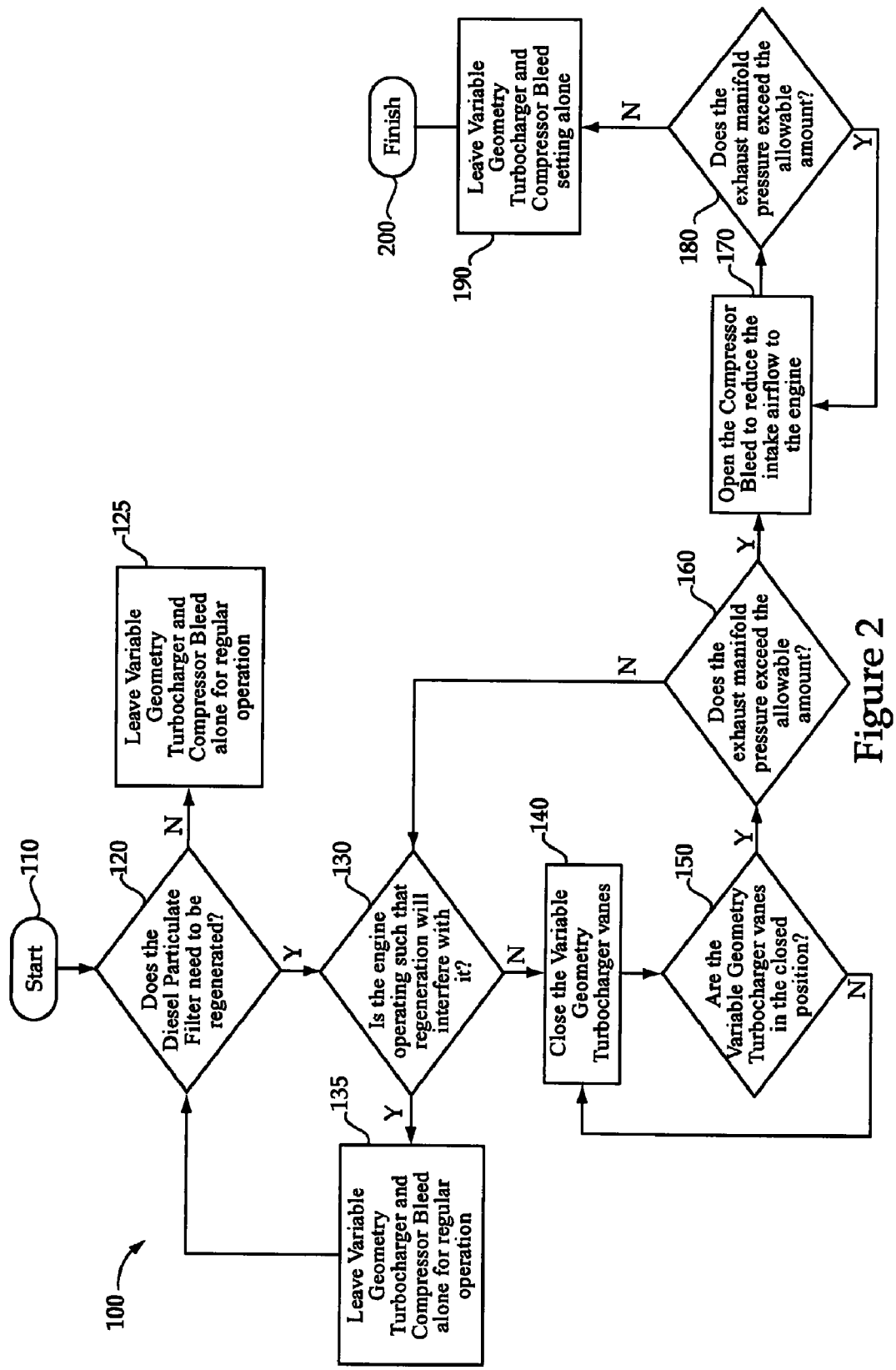
FIG. 2 is a flowchart illustrating a control process according to one embodiment.

Referring to FIG. 2, there is shown an exemplary control process according to the present disclosure via a flowchart 100. The process of flowchart 100 begins at a START or initialize step 110. From step 110, the process may proceed to step 120 wherein electronic control unit 60 may query whether particulate filter 30 needs to be regenerated. In a thermal management application other than filter regeneration, step 120 might include querying whether increased exhaust temperatures are desired downstream of engine housing 18. If no, process 100 may proceed to step 125 wherein electronic control unit 60 will leave turbine 24 and intake airflow control element 38 or the "compressor bleed" unchanged for regular operation, and the process may thenceforth exit or loop back to start over. At step 120, if filter 30 needs to be regenerated, process 100 may proceed to step 130 to query whether the engine system 16 is operating such that regeneration will interfere with operation. In other words, at step 130 it is determined whether operation would be compromised by initiating control of turbine 24 and/or element 38 for regeneration, such as might occur when engine system 16 is operating at a higher end of its output range and restricting exhaust gas flow, or reducing intake airflow would be undesirable. If at step 130 engine system 16 is operating such that regeneration is not desirable, process 100 may proceed to step 135 to conclude that turbine 24 and element 38 should be left alone for regular operation. Process 100 may then return to step 120, or might exit. If regeneration of filter 30 will not interfere with operation at step 130, the control process may proceed to step 140 wherein electronic control unit 60 can output control commands to actuator 50 to close the vanes, adjust movable walls, etc. of turbine 24. From step 140, the process may proceed to step 150 to query whether the variable geometry turbocharger vanes are in a closed position, or a predetermined partially closed position, etc. If no, the process may return to step 140. If yes, the process may proceed to step 160.

At step 160, electronic control unit 60 may query whether the exhaust manifold pressure exceeds an allowable amount. It will be recalled that electronic control unit 60 may make this determination based on inputs from sensor 48 indicative of intake manifold pressure, however, some other strategy might be used. For example, electronic control unit 60 may reference engine operating data stored in memory 62 to determine if current operating conditions correspond to exhaust manifold pressure that exceeds an allowable amount. For example, engine speed, load, fuel injection amount, turbocharger speed, etc., might be mapped to exhaust manifold pressure. In this way, electronic control unit 60 could receive inputs corresponding to some or all of these parameters and determine based thereon whether exhaust manifold pressure is likely to exceed an allowable amount.

If exhaust manifold pressure is not above the allowable amount at step 160, the process may return to step 130, or might exit. If exhaust manifold pressure is too high at step 160, the process may proceed to step 170 wherein electronic control unit 60 will output control commands to intake airflow control element 38 to adjust valve member 40 and therefore reduce intake airflow in engine system 16. From step 170, the process may proceed to step 180 wherein electronic control unit 60 may again query whether the exhaust manifold pressure exceeds the allowable amount. If yes, the process may return to step 170 to open intake airflow control element 38 again, or to further open intake airflow control element 38. It should be appreciated that other parameters than exhaust pressure may call for opening/adjusting element 38, such as turbine speed. In this manner, intake airflow control element 38 might repetitively be opened, then allowed to close, or it might be incrementally opened by increasing amounts as exhaust manifold pressure rises. From step 180, the process may proceed to step 190 if exhaust manifold pressure does not exceed the allowable amount to determine the turbine 24 and element 38 should be left alone. From step 190, the process may exit at a FINISH 200 or return to an earlier portion of the control loop.

The present description is for illustrative purposes only, and should not be construed to narrow the breadth of the present disclosure in any way. Thus, those skilled in the art will appreciate that various modification might be made to the presently disclosed embodiments without departing from the full and fair scope and spirit of the present disclosure. For example, while the present disclosure emphasizes one primary means of filter regeneration, it should be understood that the strategy disclosed herein may often be used in conjunction with other strategies. Many engine systems are operated at least periodically at temperatures sufficient to product exhaust gases at a temperature high enough to initiate combustion of particulate matter. This is generally termed "passive regeneration" and may occur frequently enough in some systems that "active regeneration" such as that described herein is used only rarely, and primarily as a back-up strategy implemented only after an associated engine system is operated such that passive regeneration does not occur, or is considered unlikely. The present disclosure might also be implemented in systems having another available active regeneration strategy, such as electric heaters, etc. It will thus be apparent to those skilled in the art that the present disclosure is broadly applicable to machines and engine systems regardless of application, duty cycle, etc. Other aspects, features and advantages will be apparent upon an examination of the attached drawings and appended claims.

What is claimed is:

1. A method of operating an internal combustion engine system comprising the steps of:
   passing exhaust gases from an internal combustion engine through an aftertreatment device at an exhaust temperature less than a target temperature;
   increasing a temperature of exhaust gases passing through the aftertreatment device to the target temperature at least in part by controllably restricting exhaust flow upstream of the aftertreatment device;
   increasing an intake manifold pressure during controllably restricting exhaust flow;
   generating a signal indicative of exhaust back pressure and indicative of the increased intake manifold pressure, during controllably restricting exhaust flow; and
   reducing exhaust pressure at least in part by selectively diverting intake airflow from the engine such that exhaust back pressure is controlled in a manner that is responsive to the signal.

2. The method of claim 1 wherein the engine comprises a compression ignition engine having a power range, and wherein the step of increasing the temperature of exhaust gases includes increasing the temperature of exhaust gases while operating the engine in a lower half of its power range.

3. The method of claim 2 wherein the step of reducing exhaust pressure further comprises reducing exhaust pressure without reducing exhaust temperature.

4. The method of claim 1 wherein:
   the step of passing exhaust gases through said aftertreatment device comprises passing exhaust gases through a particulate filter at a temperature less than a filter regeneration temperature; and
   the step of increasing a temperature of exhaust gases comprises increasing a temperature of exhaust gases to a filter regeneration temperature.

5. The method of claim 4 wherein the step of increasing a temperature of exhaust gases comprises adjusting a configuration of a variable geometry turbine.

6. The method of claim 5 further comprising a step of sensing fluid pressure at a position upstream of the variable geometry turbine, wherein the step of generating said signal comprises generating the signal based on the sensed fluid pressure.

7. The method of claim 6 wherein the step of reducing exhaust pressure further comprises diverting intake air from an intake pathway of the engine via an intake airflow control element positioned upstream an intake manifold of the engine.

8. The method of claim 7 wherein the step of reducing exhaust pressure further comprises diverting intake air from an intake pathway of the engine at a position downstream an inlet of a compressor coupled with the variable geometry turbine, the method further comprising a step of returning diverted intake air to the intake pathway at a position upstream the inlet of the compressor.

9. A method of operating an internal combustion engine system comprising the steps of:
passing exhaust gases from an internal combustion engine through an aftertreatment device at an exhaust temperature less than a target temperature;
increasing a temperature of exhaust gases passing through the aftertreatment device to the target temperature at least in part by controllably restricting exhaust flow upstream of the aftertreatment device;
generating a signal indicative of exhaust back pressure during the step of controllably restricting exhaust flow;
reducing exhaust pressure at least in part by selectively reducing airflow to the engine in a manner that is responsive to the signal;
recording exhaust back pressure data during controllably restricting exhaust flow, and recording position data for an intake airflow control element located upstream the engine during reducing exhaust pressure.

10. The method of claim 9 wherein the step of generating a signal includes generating a signal based on said recorded exhaust back pressure data and said recorded position data of an intake airflow control element.

11. An internal combustion engine system comprising:
an internal combustion engine having an exhaust outlet pathway, and an intake pathway including an intake manifold;
an aftertreatment device positioned within said exhaust outlet pathway;
a flow restriction device for increasing a temperature of exhaust gases from said engine positioned within said exhaust outlet pathway upstream of said aftertreatment device, said flow restriction device having at least two states, including an open state associated with a relatively lower exhaust back pressure and a restricted state associated with a relatively higher exhaust back pressure;
an intake airflow control element positioned upstream of said engine and configured to control an intake manifold pressure which is proportional to the exhaust back pressure; and
a control device operably coupled with said intake airflow control element to selectively divert airflow from the engine responsive to an increased intake manifold pressure occurring in response to adjusting the flow restriction device from the open state to the restricted state.

12. The engine system of claim 11 wherein said engine comprises a compression ignition engine having a power range and a duty cycle predominantly in a lower half of said power range.

13. The engine system of claim 11 further comprising an indicating device configured to output a signal indicative of exhaust back pressure upstream said flow restriction device, wherein said control device comprises an electronic control unit configured to receive said signal and said intake airflow control element comprises an actuator controllably coupled with said electronic control unit.

14. The engine system of claim 13 wherein said aftertreatment device comprises a particulate filter.

15. The engine system of claim 14 comprising a variable geometry turbine that includes said flow restriction device.

16. The engine system of claim 15 comprising a compressor coupled with said turbine and configured to supply intake air to said engine, wherein said compressor includes an inlet and said intake airflow control element is positioned downstream said inlet.

17. A control system for thermal management of an aftertreatment device of an internal combustion engine comprising:
an electronic control unit configured to selectively increase a temperature of exhaust gases passing through the aftertreatment device to a target temperature at least in part via commanding adjusting of a variable flow restriction device fluidly between the engine and the aftertreatment device from a relatively more open state to a relatively more restricted state; and
an indicating device configured to output a signal indicative of exhaust back pressure upstream of said flow restriction device, and indicative of an increased intake manifold pressure occurring in response to adjusting the flow restriction device to the relatively more restricted state;
said electronic control unit being further configured to reduce exhaust pressure upstream said flow restriction device via commanding opening an intake airflow control element for the engine such that intake air is diverted from the engine in a manner that is responsive to the signal.

18. The control system of claim 17 wherein said indicating device comprises at least one pressure sensor configured to monitor a fluid pressure associated with exhaust pressure between the variable flow restriction device and the engine.

19. The control system of claim 18 further comprising means for determining a value indicative of a pressure drop across an exhaust gas particulate filter, and means for initiating regenerating of the exhaust gas particulate filter via commanding adjusting said flow restriction device responsive to the determined value.

* * * * *

UNITED STATES PATENT AND TRADEMARK OFFICE
CERTIFICATE OF CORRECTION

Page 1 of 1

PATENT NO. : 8,024,919 B2
APPLICATION NO. : 11/888034
DATED : September 27, 2011
INVENTOR(S) : Fluga et al.

It is certified that error appears in the above-identified patent and that said Letters Patent is hereby corrected as shown below:

Title Page, Col. 2, Item 56 (Other Publications) lines 1-4,
delete "Broge, Cummins is ready for the new year, Commercial Vehicle Engineering, Oct. 2006; pp. 1-4, SAE International. http://www.sae.org/automag/features/eblast/10-2006/1-114-10-4.pdf, 1 page, published prior to Oct. 1, 2006."
and insert -- Broge, Cummins is ready for the new year, Commercial Vehicle Engineering, Oct. 2006; pp. 1-4, SAE International.
http://www.sae.org/automag/features/eblast/10-2006/1-114-10-4.pdf, 1 page, published prior to Oct. 1, 2006. --.

Signed and Sealed this
Twenty-eighth Day of July, 2015

Michelle K. Lee
*Director of the United States Patent and Trademark Office*